(12) United States Patent
Gotoh et al.

(10) Patent No.: US 7,384,198 B2
(45) Date of Patent: Jun. 10, 2008

(54) ROLLING BEARING

(75) Inventors: Fusasuke Gotoh, Kanagawa (JP);
Hiroshi Ishiguro, Kanagawa (JP);
Naoki Fukuda, Kanagawa (JP);
Toshihisa Ohata, Kanagawa (JP)

(73) Assignee: NSK Ltd., Tokyo (JP)

( * ) Notice: Subject to any disclaimer, the term of this patent is extended or adjusted under 35 U.S.C. 154(b) by 399 days.

(21) Appl. No.: 09/925,020

(22) Filed: Aug. 9, 2001

(65) Prior Publication Data

US 2002/0051595 A1   May 2, 2002

(30) Foreign Application Priority Data

Aug. 9, 2000 (JP) .................. P. 2000-241409
Aug. 9, 2001 (JP) .................. P. 2001-242387

(51) Int. Cl.
*F16C 19/04* (2006.01)
*F16C 33/58* (2006.01)

(52) U.S. Cl. ....................... 384/490; 384/516

(58) Field of Classification Search ................ 384/490, 384/456, 462, 513, 516, 609, 615, 618, 622
See application file for complete search history.

(56) References Cited

U.S. PATENT DOCUMENTS

| | | | | |
|---|---|---|---|---|
| 3,969,005 A | * | 7/1976 | Traut | 384/552 |
| 4,050,845 A | * | 9/1977 | Gemein et al. | 384/100 |
| 4,191,432 A | * | 3/1980 | Miki et al. | 384/482 |
| 4,371,220 A | * | 2/1983 | Brucher | 369/269 |
| 4,629,337 A | * | 12/1986 | Teramachi | 384/43 |
| 4,650,195 A | * | 3/1987 | Dreschmann et al. | 277/565 |
| 4,848,936 A | * | 7/1989 | Marie | 384/454 |
| 4,856,916 A | * | 8/1989 | Ito et al. | 277/402 |
| 5,110,222 A | * | 5/1992 | Johnson et al. | 277/402 |
| 5,531,525 A | * | 7/1996 | Hida et al. | 384/482 |
| 5,655,844 A | * | 8/1997 | Takano | 384/453 |
| 5,667,045 A | * | 9/1997 | Cummings, III | 192/18 A |
| 5,818,133 A | * | 10/1998 | Kershaw et al. | 310/64 |
| 5,967,671 A | * | 10/1999 | Obara | 29/898.07 |
| 6,170,625 B1 | * | 1/2001 | Tanaka | 192/45 |
| 6,329,326 B1 | * | 12/2001 | Iso et al. | 384/462 |
| 6,499,881 B2 | * | 12/2002 | Boutaghou et al. | 384/107 |
| 2002/0054720 A1 | * | 5/2002 | Obara | |

FOREIGN PATENT DOCUMENTS

| | | | | |
|---|---|---|---|---|
| JP | 1122753 | A | * | 1/1999 |
| JP | 11-218134 | | | 8/1999 |
| JP | 11238298 | A | * | 8/1999 |
| JP | 2000-74052 | A | * | 3/2000 |
| JP | 2000-119673 | A | * | 4/2000 |

\* cited by examiner

*Primary Examiner*—Robert A. Siconolfi
(74) *Attorney, Agent, or Firm*—Sughrue Mion, PLLC

(57) ABSTRACT

In a rolling bearing structured such that a plurality of rolling elements are respectively held between inner and outer rings by a retainer, grease is sealed in by a seal, a rotary body with the outer ring fitted therewith and a shaft with the inner ring fitted therewith can be connected together by a clutch mechanism and, when the rotary body and shaft are connected together by the clutch mechanism, the rolling bearing can be used on receiving a rotation load while the relative rotation between the inner and outer rings is zero, an initial radial clearance between the inner and outer rings is set such that a bearing effective clearance when the present rolling bearing is incorporated into between the rotary body and shaft can provide a positive value.

17 Claims, 10 Drawing Sheets

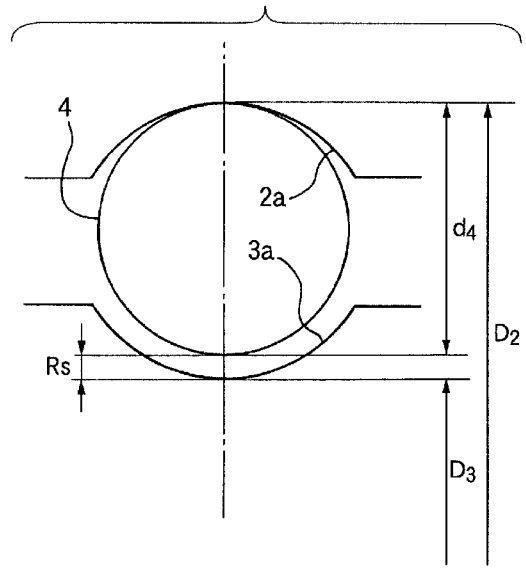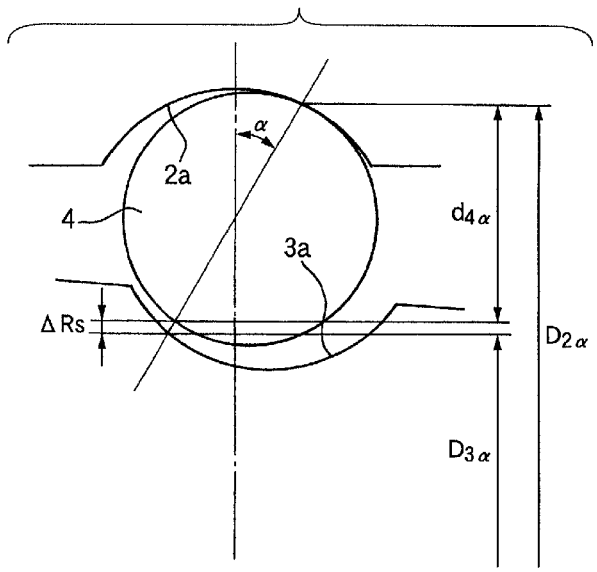
FIG.5(a)
FIG.5(b)

ROLLING BEARING

BACKGROUND OF THE INVENTION

The present invention relates to a rolling bearing structured such that a rotary body with an outer ring fitted therewith and a shaft with an inner ring fitted therewith can be connected together by a clutch mechanism and, when the rotary body and shaft are connected together by the clutch mechanism, with no relative rotation between the inner and outer rings, the rolling bearing can be used on receiving a rotation load; and, in more particular, to an improvement in such rolling bearing which can prevent occurrence of fretting in the bearing raceway surfaces thereof to thereby enhance the life thereof.

Now, FIGS. 1 and 2 show the states of use of a rolling bearing.

A rolling bearing 1 shown in FIGS. 1 and 2 is a combined bearing, in which, between the raceway surface 2a of an outer ring 2 and the raceway surface 3a of an inner ring 3, there is interposed spherical-shaped rolling elements 4. The rolling elements 4 are respectively held by a retainer (not shown) in such a manner that they are spaced at given intervals in the peripheral direction of the raceway surfaces 2a, 3a. Also, grease is sealed in by a seal (not shown).

In the rolling bearing 1, the outer ring 2 is fitted with the inner periphery of a rotary body 6, whereas the inner ring 3 is fitted with the outer periphery of a shaft 8. The rotary body 6 is a pulley which can be driven through a belt wound on a belt groove 6a formed in the outer periphery thereof, while the other end portion (not shown) of the rotary body 6 provides an output end thereof.

The rotary body 6 and shaft 8 can be connected together by a clutch mechanism 12.

The clutch mechanism 12 is an electromagnetic clutch which is composed of a clutch plate 13 fixed to the end portion of the shaft 8 and an electromagnetic drive portion 14 for attracting the outer peripheral portion of the clutch plate 13 to the rotary body 6 using an electromagnetic force. And, FIG. 1 shows a clutch-off state in which the rotary body 6 and shaft 8 can be rotated with respect to each other, whereas FIG. 2 shows a clutch-on state in which the rotary body 6a nd shaft 8 is prevented against their relative rotation.

In the clutch-off state shown in FIG. 1, a rotation force input to the rotary body 6 is not transmitted to the shaft 8, but the outer and inner rings 2 and 3 of the rolling bearing 1 can be rotated with respect to each other. On the other hand, in the clutch-on state shown in FIG. 2, since the rotary body 6 and shaft 8 is rotated integrally due to the rotary force input to the rotary body 6, the relative rotation between the outer and inner rings 2 and 3 of the rolling bearing 1 is zero.

By the way, generally, when designing a rolling bearing, in order to reduce noise in a high speed operation and to prevent play between the rotary body 6 and shaft 8, an initial radial clearance between inner and outer rings is set in such a manner that a bearing effective clearance when the rolling bearing is incorporated into between the rotary body 6 and shaft 8 can be reduced as much as possible.

However, as shown in FIG. 2, in the clutch-on state, when the outer and inner rings 2 and 3 are driven or rotated with their relative rotation zero, as shown by arrow marks A-E in FIGS. 7(a)-(e), with the rotation of the outer and inner rings 2 and 3, the direction of a rotation load is moved. And, when the rolling body 4 is situated directly below the rotation load direction, a load acting on the rolling body 4 increases; and, therefore, as shown by solid lines in FIGS. 8(a) and (b), a contact area S1 between the rolling body 4 and raceway surface 3a increases. On the other hand, when the rolling body 4 is situated on the opposite side to the rotation load direction, the load acting on the rolling body 4 decreases; and, therefore, as shown by broken lines in FIGS. 8(a) and (b), a contact area S2 between the rolling body 4 and raceway surface 3a decreases.

And, as described above, especially, in case where the bearing effective clearance is set small, that is, for example, the bearing effective clearance is zero, contact positions between the respective rolling elements 4 and raceway surface 3a remain unchanged. Therefore, variations in the above-mentioned load acting on the rolling body 4 cause slight slippage between the mutual contact surfaces of the raceway surface 3a and rolling body 4 and thus, in case where the rolling body 4 collides repetitively with the raceway surface 3a at the same position, there occurs fretting which gives rise to local wear on the raceway surface 3a. This local wear causes strange sounds and reduces the life of the bearing. Or, due to worn powder produced in the local wear, the life of the grease can be shortened.

In order to prevent the local wear which is caused by such fretting, conventionally, there is also proposed a technique in which a coating film is formed on the surface of the rolling body 4 or on the raceway surface 3a to thereby prevent the raceway surface 3a and rolling elements 4 against direct contact with each other (see Japanese Patent Unexamined Publication No. Hei.11-218134). However, in this technique, formation of the coating film complicates a process for manufacturing the component parts of a rolling bearing, which results in the increased cost of the rolling bearing.

SUMMARY OF THE INVENTION

The invention aims at eliminating the above-mentioned problems found in the conventional rolling bearings. Accordingly, it is an object of the invention is to provide a rolling bearing which, with no relative rotation between inner and outer rings, can be used on receiving a rotation load, wherein there is eliminated a fear of incurring the complication of a process for manufacturing the component parts of the rolling bearing, fretting can be prevented inexpensively and positively, generation of strange sounds and reduction in the life of the bearing due to local wear caused by such fretting can be prevented, and reduction in the life of grease due to worn powder produced in the local wear can be prevented.

In attaining the above object, according to the invention, there is provided a rolling bearing structured such that a plurality of rolling elements are held between inner and outer rings by a retainer, grease is sealed in by a seal, a rotary body with the outer ring fitted therewith and a shaft with the inner ring fitted therewith can be connected together by a clutch mechanism, and, when the rotary body and shaft are connected together by the clutch mechanism, with no relative rotation between the inner and outer rings, the rolling bearing can be used on receiving a rotation load, wherein an initial radial clearance between the inner and outer rings is set in such a manner that a bearing effective clearance when the bearing is incorporated between the rotary body and shaft provides a positive value.

In the above structure, preferably, the initial radial clearance may be set as large as possible unless a defect such as a ball run-out/onto-groove-shoulder phenomenon can occur. For example, in the case of a combined ball bearing having an inside diameter of 50 mm, an outside diameter of 72 mm and a combined width of 24 mm, preferably, the initial radial clearance may be set such that the bearing effective clearance is in the range of 0.020-0.060 mm, preferably, in the range of 0.040-0.60 mm.

And, according to the above structure, for example, in case where an input to the rotary body with the outer ring fitted therewith is transmitted to the shaft with the inner ring fitted therewith through the clutch mechanism, in the off-state of the clutch mechanism, the rotational force is not transmitted from the rotary body to the shaft; and, therefore, even in case where the outer ring is rotated, the inner ring remains fixed and thus, between the inner and outer rings of the rolling bearing, there is produced relative rotation, thereby preventing fretting in which the rolling elements repetitively collide with the raceway surface of the inner ring or outer ring at the same position thereof.

Also, in case where the clutch mechanism is held in the on-state, the rotary body and shaft are connected together by the clutch mechanism in such a manner that they can be rotated integrally, so that there is no relative rotation between the inner and outer rings of the rolling bearing.

However, even in case where the inner and outer rings of the rolling bearing rotate together, i.e., with no relative rotation, since the bearing effective clearance in the radial direction is previously set at a positive value, as shown in FIG. 3, the rolling elements, correspondingly to the rotation of the inner and outer rings, shifts not on the actual raceway surface of the inner ring but on a virtual inscribed circle shown by broken lines in FIG. 3. In other words, as shown by the arrow marks (A)-(B) in FIGS. 3-(a)-(e), when the rotation load direction moves with the rotation of the inner and outer rings, due to the difference between the circumference length of the virtual inscribed circle and the circumference length of the actual raceway surface of the inner ring, the contact position of the rolling element with the actual raceway surface of the inner ring gradually shifts counterclockwise in FIG. 3.

Therefore, as described above, also in case where the inner and outer rings of the rolling bearing are driven or rotated with no relative rotation in the clutch-on state, there can be prevented fretting in which the rolling element collides repetitively with the raceway surface of the inner or outer ring at the same position thereof.

Further, in mounting an actual bearing, as shown in FIG. 5(b), in some cases, due to a mounting error, there is caused an inclination a between the inner and outer rings. In these cases, although the effective bearing effective clearance is narrowed, as described above, in case where the initial radial clearance is set such that the bearing effective clearance can be in the range of 0.020-0.06 mm, preferably, in the range of 0.040-0.060 mm, there can be secured necessarily and sufficiently the operation effect that the contact position between the rolling element and raceway surface is gradually shifted due to the difference between the circumference length of the virtual inscribed circle and the circumference length of the actual raceway surface of the inner ring.

Also, according to the invention, when compared with the conventional rolling bearing structured such that fretting can be prevented by setting an initial radial clearance and a coating film is formed on the surface of a rolling element for prevention of the fretting, there is eliminated a fear of incurring the complication of the process for manufacturing the component parts of the rolling bearing.

That is, in the case of the structure according to the invention, in a rolling bearing which can be used on receiving the rotation load with the relative rotation between the inner and outer rings zero, there is no fear of incurring the complication of the process for manufacturing the component parts of the rolling bearing, the fretting can be prevented inexpensively and positively, generation of strange sounds and the reduction in the life of the bearing due to the local wear caused by the fretting can be prevented, and the reduction in the life of grease due to the worn powder produced in the local wear can also be prevented.

Further, in the above structure according to the invention, preferably, (1) the depths of the respective grooves formed in the inner and outer rings may be set 17% or more of the diameter of the rolling element;

(2) the interference of the seal lip of the seal may be set 60% or more of the axial clearance; and, (3) as the grease, there may be used base oil having a dynamic viscosity of 80 mm$^2$/s or more at 40° C.

Here, as in the above structure, in case where the bearing effective clearance is set large, there is a fear that the so called play of the bearing can increase and thus, in case where a contact seal is used, the sealing performance of the contact seal can be lowered. And, there is also a fear that resistance against the ball run-onto-groove-shoulder phenomenon can be reduced. In view of them, as in the above condition (1), in case where the depths of the respective grooves formed in the inner and outer rings are set 17% or more of the diameter of the rolling element, preferably, 20% or more, reduction in the resistance against the ball run-onto-groove-shoulder phenomenon can be controlled. Referring to the sealing performance, as in the above condition (2), in case where the interference of the seal lip of the seal is set 60% or more of the axial clearance, even in the worst case, the interference can be left, which makes it possible to prevent the grease against leakage.

Also, due to the viscosity of the base oil used as grease to be sealed in, the fretting resistance can be improved. In a bearing which receives external vibrations, the higher the viscosity of the base oil is, the higher the strength of the oil film is, thereby being able to control the fretting wear. In the above structure, as in the condition (3), it is effective to use base oil the dynamic viscosity at 40° C. of which is 80 mm$^2$/s or higher.

BRIEF DESCRIPTION OF THE DRAWINGS

FIG. 2 is a longitudinal section view of the embodiment of a rolling bearing according to the invention and, in particular, a longitudinal section view thereof when the inner and outer rings of the rolling bearings are prevented against rotation with respect to each other because the clutch mechanism is on;

FIGS. 5(a) and (b) are respectively section views of reduction in the bearing effective clearance corresponding to the inclinations of the inner and outer rings;

DETAILED DESCRIPTION OF THE PREFERRED EMBODIMENTS

Now, description will be given below in detail of the preferred embodiments of a rolling bearing according to the invention with reference to the accompanying drawings.

Figure 1:
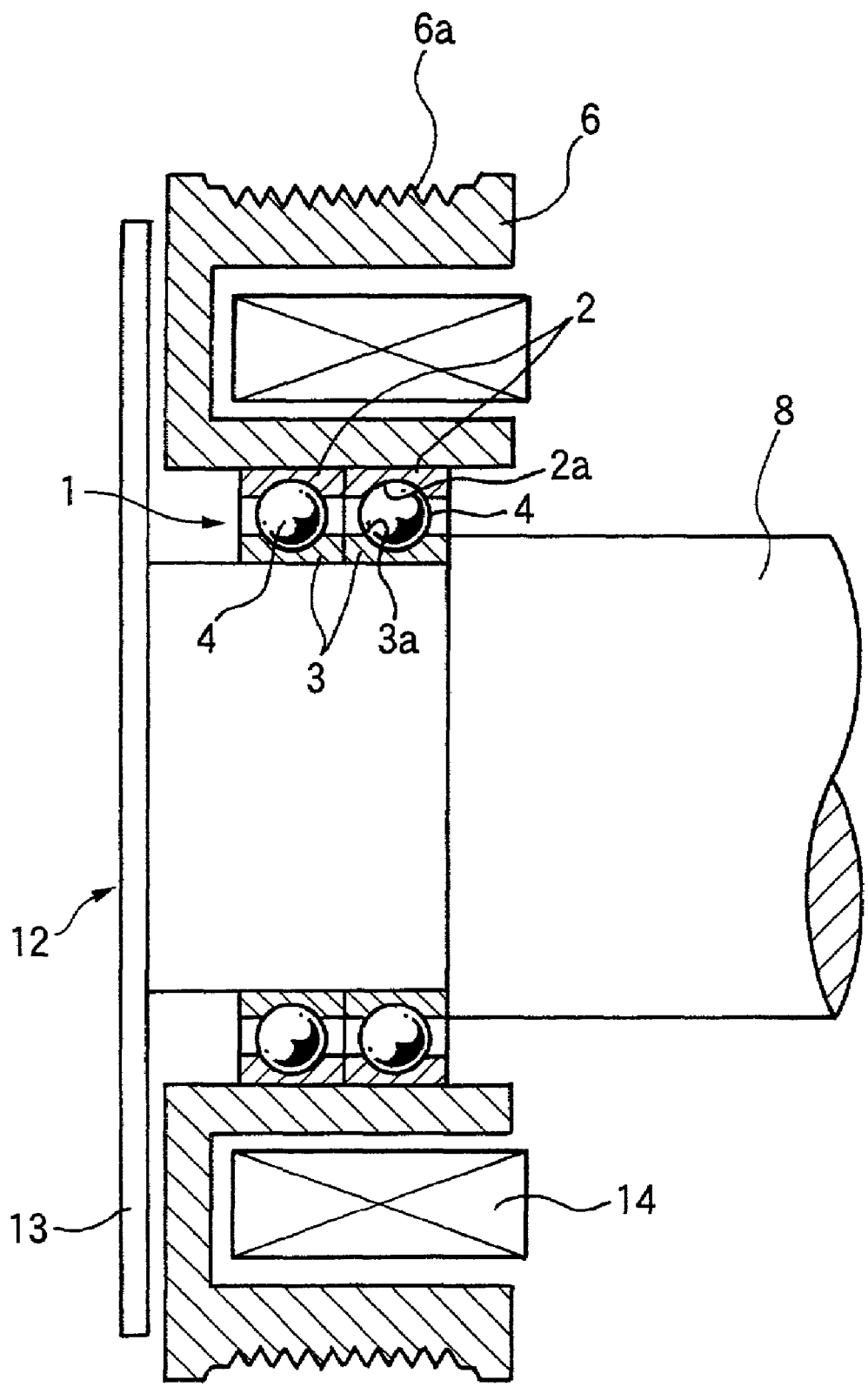
FIG. 1 is a longitudinal section view of an embodiment of a rolling bearing according to the invention and, in particular, a longitudinal section view thereof when the inner and outer rings of the rolling bearings can be rotated with respect to each other because a clutch mechanism is off.
Figure 2:
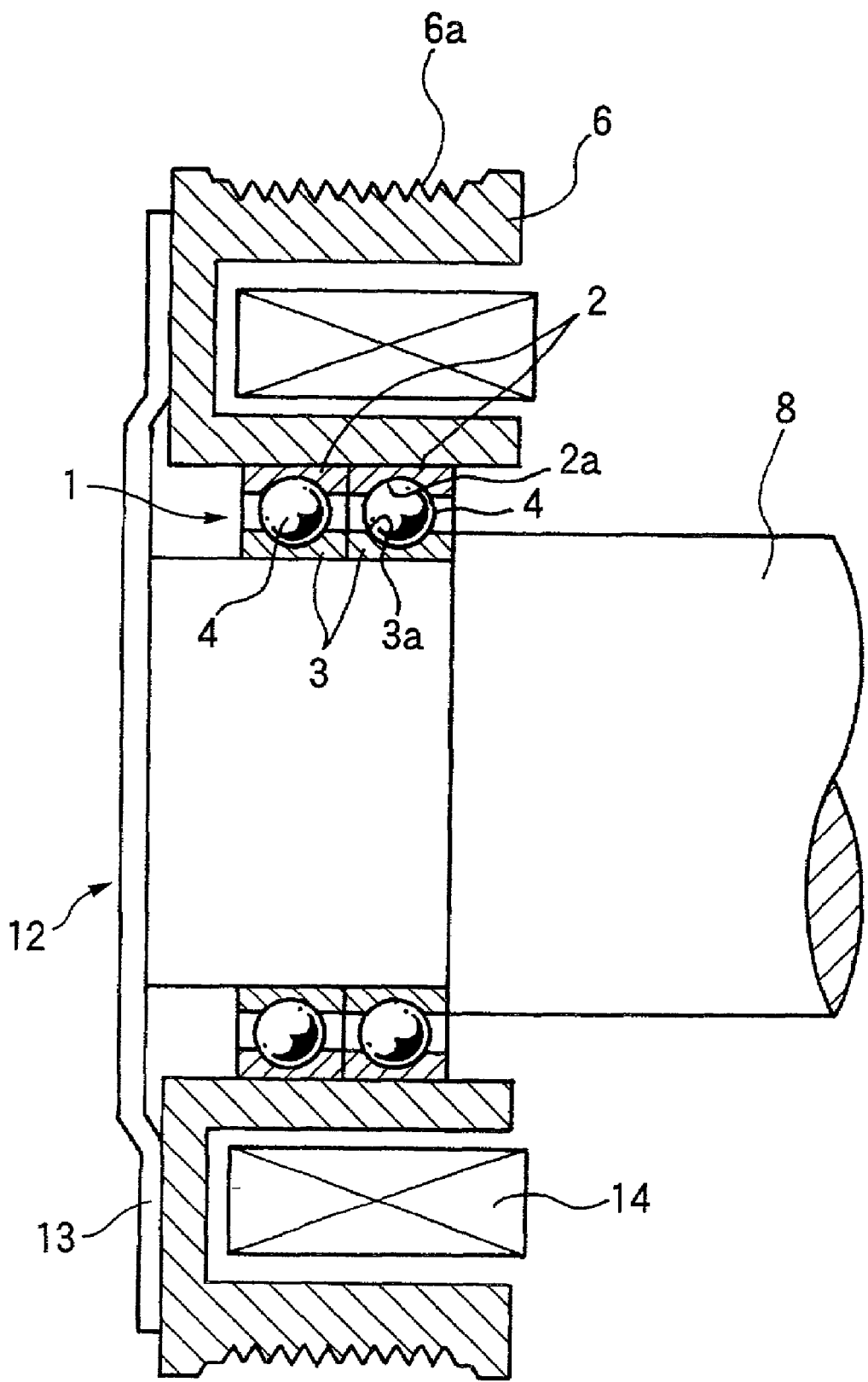
Figure 3A:
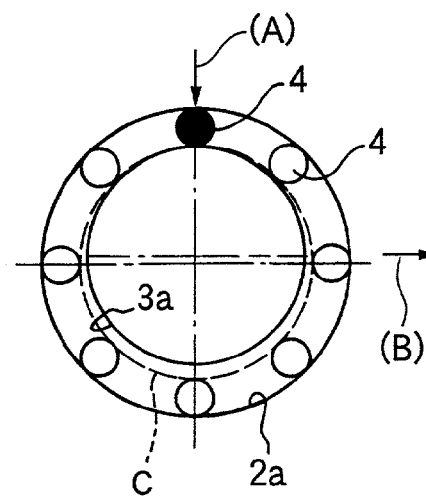
FIGS. 3(a)-(e) are respectively explanatory views of variations in a load direction when the inner and outer rings are driven or rotated integrally in the on state of the clutch mechanism shown in FIG. 2.
Figure 3B:
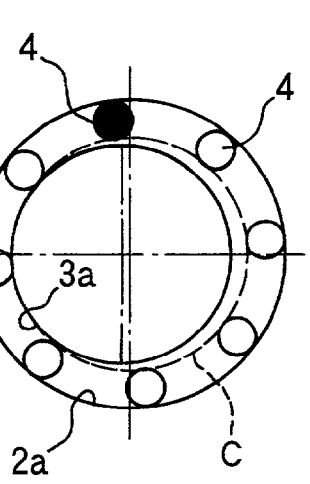
Figure 3C:
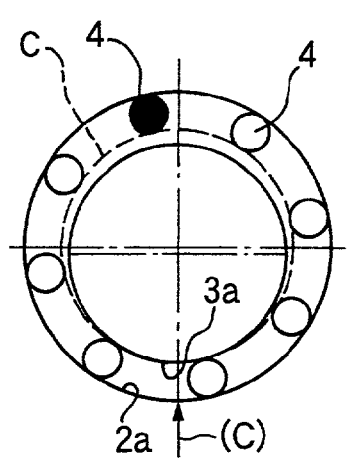
Figure 3D:
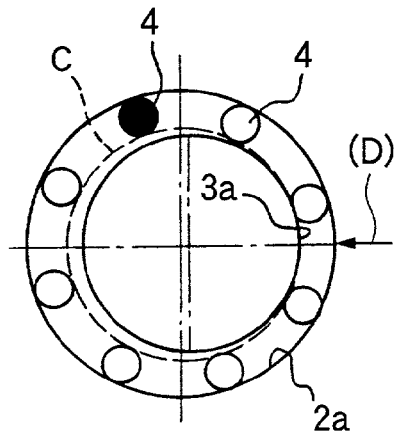
Figure 3E:
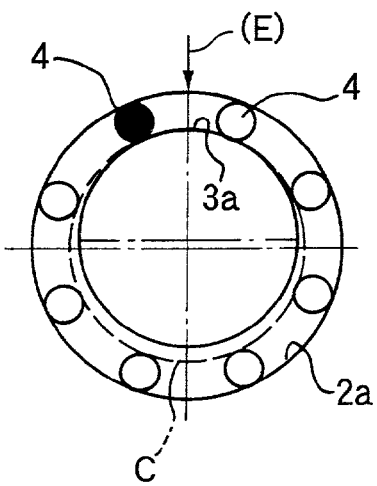
Figure 4:
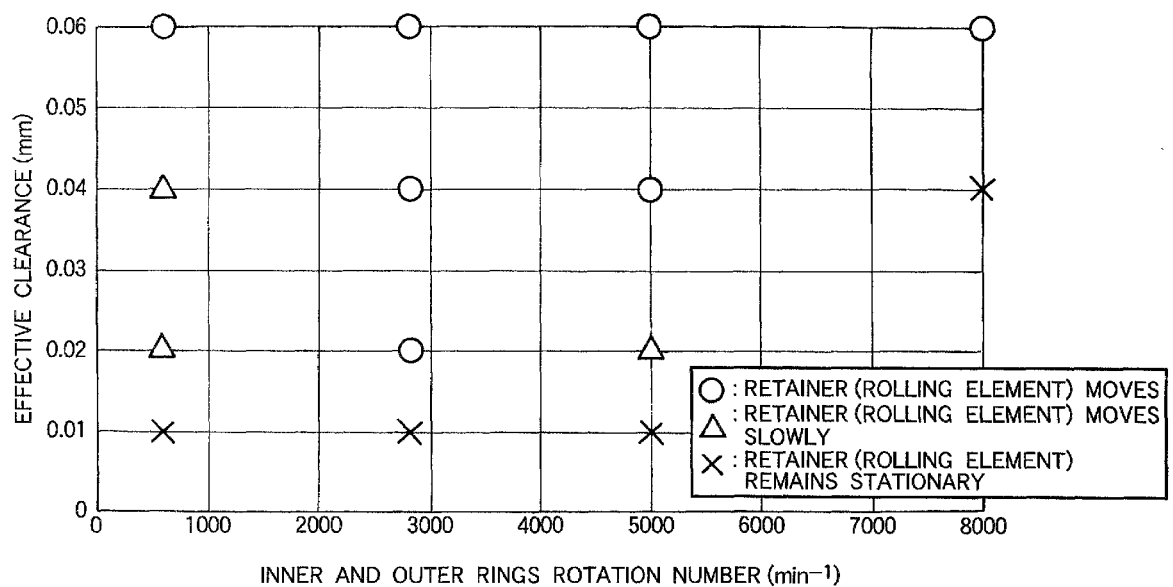
FIG. 4 is a view of the correlation between the number of rotations of the inner and outer rings and the behavior of a retainer (rolling element) when a bearing effective clearance is varied in the on state of the clutch mechanism shown in FIG. 2.
Figure 6:
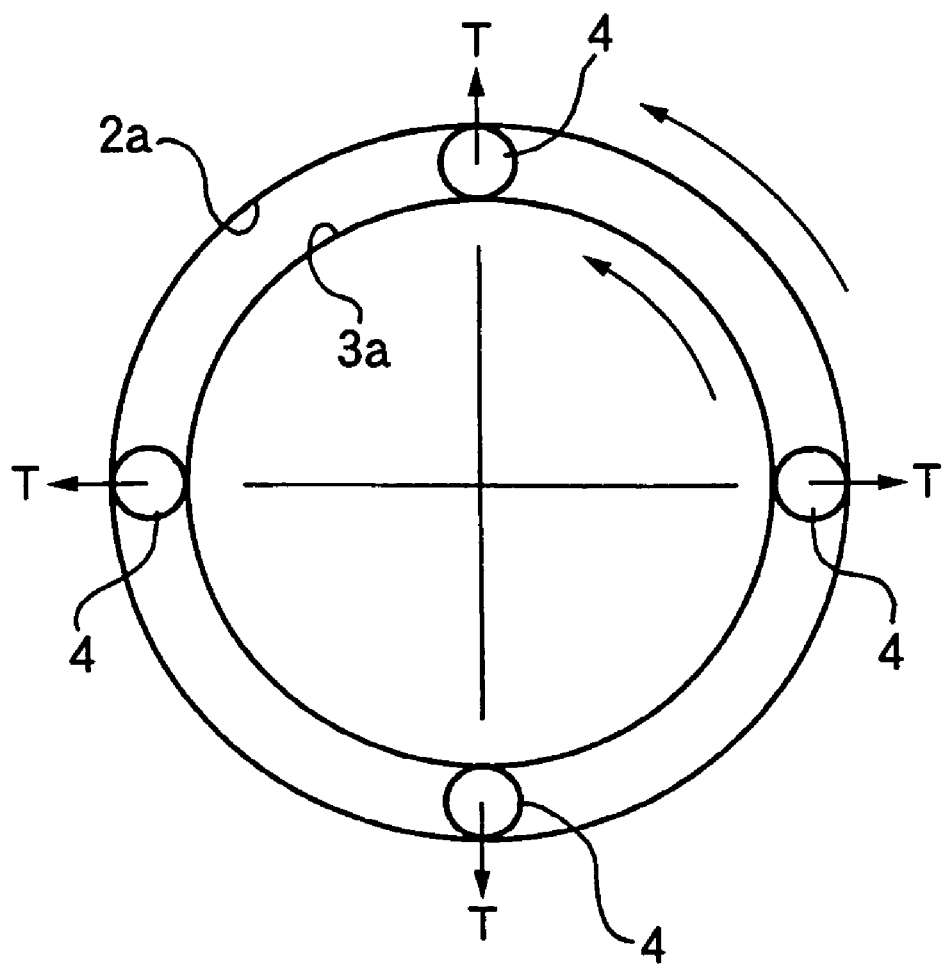
FIG. 6 is an explanatory view of the action of a centrifugal force applied to the respective rolling elements when the inner and outer rings are rotated integrally at a high speed.
Figure 7A:
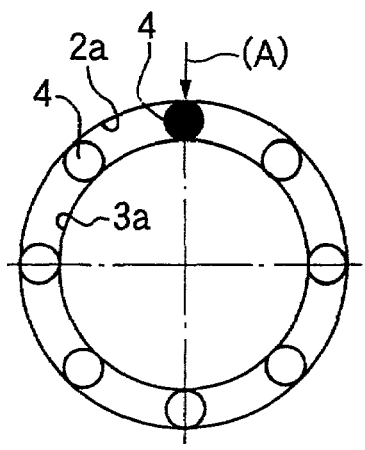
FIGS. 7(a)-(e) are respectively explanatory views of variations in a load direction when the inner and outer rings are driven or rotated integrally.
Figure 7B:
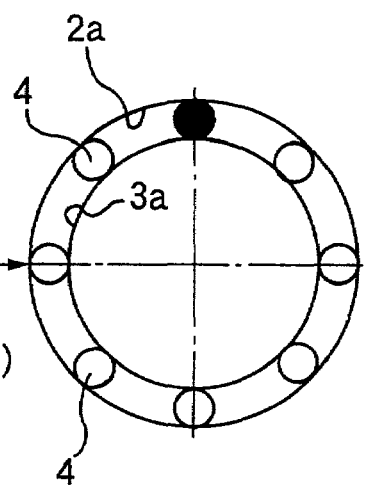
Figure 7C:
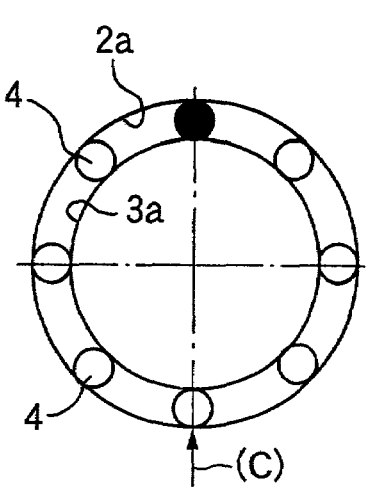
Figure 7D:
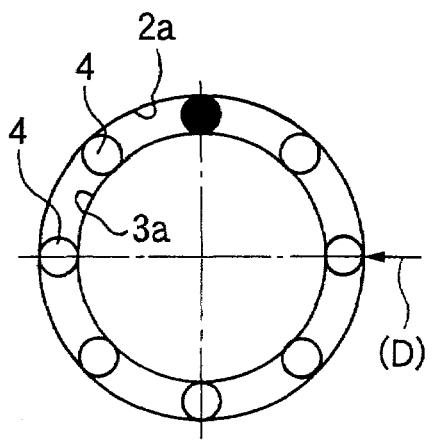
Figure 7E:
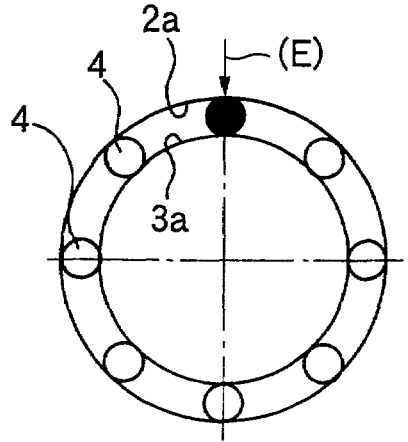
Figure 8A:
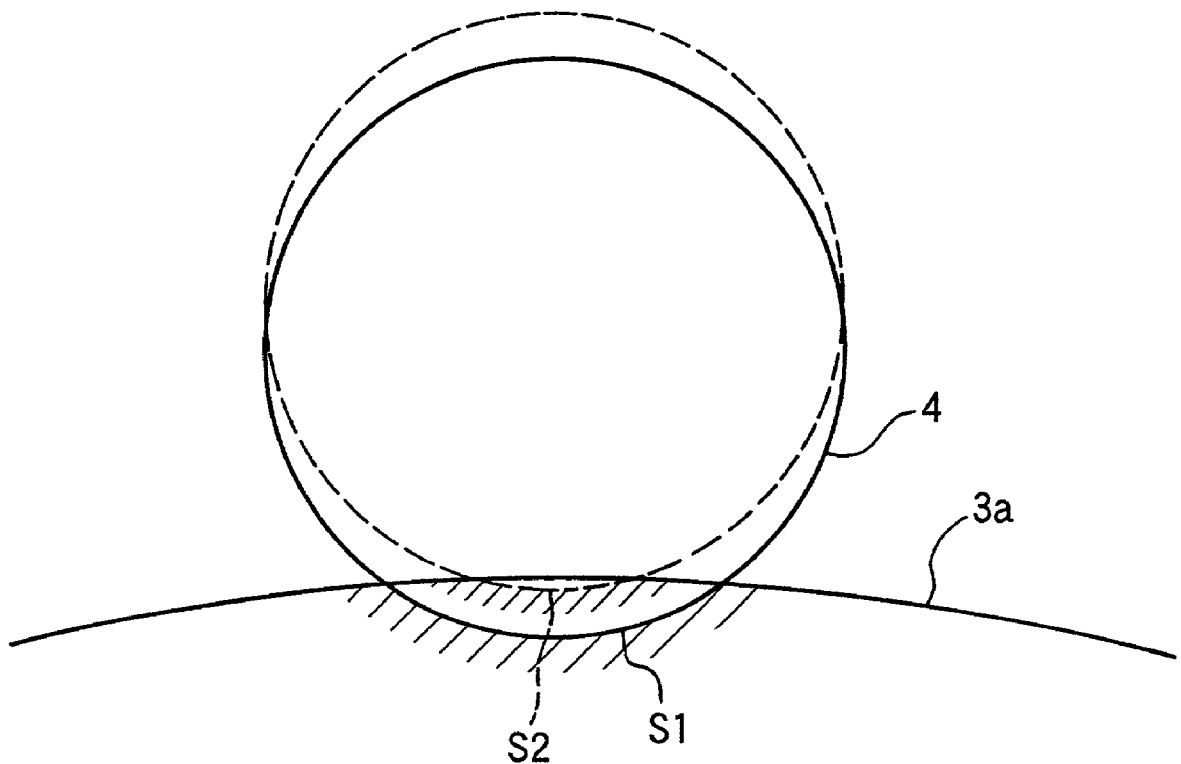
FIG. 8(a) is a section view to show a contact state between a rolling element and the raceway surface of an inner ring when they are just below the load direction and on the opposite position; and, FIG. 8(b) is an explanatory view of contact areas S1, S2 between the rolling element and the raceway surface of the inner ring when they are just below the load direction and on the opposite position.
Figure 8B:
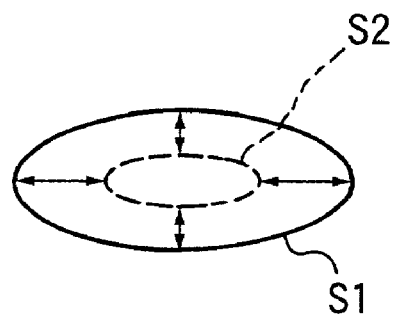

FIGS. 1 to 6 show an embodiment of a rolling bearing according to the invention. Specifically, FIG. 1 is a longitudinal section view of an embodiment of a rolling bearing according to the invention, in particular, a longitudinal section view thereof when the inner and outer rings of the rolling bearings can be rotated with respect to each other because a clutch mechanism is off; FIG. 2 is a longitudinal section view of the embodiment of a rolling bearing according to the invention, in particular, a longitudinal section view thereof when the inner and outer rings of the rolling bearings are prevented against rotation with respect to each other because the clutch mechanism is on; FIG. 3 is an explanatory view of variations in a load direction when the inner and outer rings are driven or rotated integrally while the clutch mechanism shown in FIG. 2 is on; FIG. 4 is a view of the correlation between the number of rotations of the inner and outer rings and the behavior of a retainer (rolling body) when a bearing effective clearance is varied while the clutch mechanism shown in FIG. 2 is on; FIG. 5 is a section view of reduction in the bearing effective clearance corresponding to the inclinations of the inner and outer rings; and, FIG. 6 is an explanatory view of the action of a centrifugal force applied to the respective rolling elements when the inner and outer rings are rotated integrally at a high speed.

The rolling bearing 1 according to the present embodiment, schematically, has the same structure as shown in FIGS. 1 and 2. That is, the rolling bearing 1 is a combined ball bearing in which, between the raceway surface 2a of an outer ring 2 and the raceway surface 3a of an inner ring 3, there are interposed spherical-shaped rolling elements 4. The rolling elements 4 are held at given intervals in the peripheral directions of the respective raceway surfaces 2a and 3a by a retainer (not shown). Although not shown, grease is sealed in by a seal.

In the rolling bearing 1, the outer ring 2 is fitted with the inner periphery of a rotary body 6, whereas the inner ring 3 is fitted with the outer periphery of a shaft 8. The rotary body 6 is a pulley which can be driven through a belt wound around a belt groove 6a formed in the rotary body 6, while the shaft 8 is structured such that the other end portion thereof (not shown) provides its output end.

The rotary body 6 and shaft 8 can be connected together by a clutch mechanism 12.

The clutch mechanism 12 is an electromagnetic clutch which is composed of a clutch plate 13 fixed to the end portion of the shaft 8 and an electromagnetic drive portion 14 for attracting the outer peripheral portion of the clutch plate 13 to the rotary body 6 using an electromagnetic force. Here, FIG. 1 shows a clutch-off state in which the rotary body 6 and shaft 8 can be rotated with respect to each other, whereas FIG. 2 shows a clutch-on state in which the rotary body 6 and shaft 8 is prevented against their relative rotation.

In the clutch-off state shown in FIG. 1, a rotation force input to the rotary body 6 is not transmitted to the shaft 8, but the outer and inner rings 2 and 3 of the rolling bearing 1 can be rotated with respect to each other. On the other hand, in the clutch-on state shown in FIG. 2, since the rotary body 6 and shaft 8 are rotated integrally due to the rotary force input to the rotary body 6, the relative rotation between the outer and inner rings 2 and 3 of the rolling bearing 1 is zero.

However, in the rolling bearing 1 according to the present embodiment, an initial radial clearance between inner and outer rings 3 and 2 is set in such a manner that a bearing effective clearance, when the rolling bearing is incorporated into between the rotary body 6 and shaft 8, is 0.020 mm or more, preferably, in the range of 0.040-0.060 mm.

According to the above structure, for example, when an input to the rotary body 6 with the outer ring 2 fitted therewith is transmitted through the clutch mechanism 12 to the shaft 8 with the inner ring 3 fitted therewith, in the off state of the clutch mechanism 12, the rotation force is not transmitted from the rotary body 6 to the shaft 8; and, even in case where the outer ring 2 rotates, the inner ring 3 remains fixed, thereby producing relative rotation between the outer and inner rings 2 and 3 of the rolling bearing 1. As a result of this, there is prevented occurrence of fretting in which the rolling elements 4 collide repetitively with the raceway surface of the inner ring 3 or outer ring 2 at the same position thereof.

Also, in case where the clutch mechanism 12 is held in the on state, since the rotary body 6 and shaft 8 are connected together by the clutch mechanism 12 so as to be rotatable integrally with each other, the relative rotation between the outer and inner rings 2 and 3 of the rolling bearing 1 is zero.

However, even in case where the outer and inner rings 2 and 3 of the rolling bearing 1 are rotated with their relative rotation zero, since the bearing effective clearance in the radial direction is previously set at a positive value, as shown in FIG. 3, the rolling element 4, according to the rotation of the outer and inner rings 2, does roll on the actual raceway surface 3a of the inner ring 3 but rolls while shifting on a virtual inscribed circle C shown by broken lines in FIG. 3; that is, as shown by arrow marks (A)-(E) in FIGS. 3(a)-(e), when the rotation load direction moves with the rotation of the outer and inner rings 2 and 3, due to the difference between the circumference length of the virtual inscribed circle C and the circumference length of the actual raceway surface 3a of the inner ring 3, the contact position of the rolling element 4 with respect to the raceway surface 3a of the inner ring 3 is gradually shifted counterclockwise in FIG. 3.

Therefore, as described above, also in case where the outer and inner rings 2 of the rolling bearing 1 are rotated with their relative rotation zero in the clutch-on state, there is prevented occurrence of fretting in which the rolling element 4 collides repetitively with the raceway surface of the inner ring 3 or outer ring 2 at the same position thereof.

And, when compared with the conventional rolling bearing in which occurrence of fretting is prevented by setting an initial radial clearance and a coating film is formed on the surface of the rolling element 4 for prevention of the fretting, according to the present embodiment, there is also eliminated a fear of incurring the complication of the process for manufacturing the component parts of the rolling bearing 1.

That is, according to the above structure of the invention, in the rolling bearing 1 which, with the relative rotation between the outer and inner rings 2 and 3 zero, can be used on receiving a rotation load, there is eliminated a fear of incurring the complication of the process for manufacturing the component parts of the rolling bearing 1, the fretting can be prevented inexpensively and positively, generation of strange sounds and reduction in the life of the rolling a bearing due to local wear caused by the fretting can be prevented, and reduction in the life of the grease caused by worn powder due to the local wear can be prevented.

The present inventors, in order to confirm the above-mentioned operation effects due to the bearing effective clearance, checked the presence or absence of the movement of the rolling body (retainer) on the raceway surface with respect to previously-set bearing effective clearances. The results of the our check are shown in FIG. 4.

As the bearing effective clearances, there were used four kinds of clearances, specifically, 0.01 mm, 0.023 mm, 0.042 mm, and 0.060 mm. And, for the respective bearing effective clearances, the presence or absence of the movement of the rolling element 4 was sampled and checked.

According to this check, theoretically, the larger the rotation speed of the outer and inner rings 2, 3 is, the more easily the rolling element 4 can move on the raceway surface 3a. However, actually, as can be seen clearly from FIG. 4 as well, it has been found that, when the rotation speed of the outer and inner rings 2, 3 is 2800 or so, the rolling element 4 becomes easy to move and, at the larger rotation speed than this, on the contrary, the rolling element 4 becomes gradually harder to move. And, it has been also found that, in case where the bearing effective clearance is 0.020 mm or more, the rolling element 4 is easy to move. Especially, in the bearing effective clearance of 0.040 mm or more, the rolling element 4 is outstandingly easy to move.

The reason for the above is believed that, as shown in FIG. 6, in case where the rotation speed of the outer and inner rings 2, 3 increases, the influence of a centrifugal force T acting on the rolling element 4 increases and, due to the centrifugal force, the rolling element 4 is strongly pressed against the raceway surface 2a of the outer ring 2 to thereby restrict the movement of the rolling element 4.

Also, the above description, as shown in FIG. 5(a), has been given of a radial clearance Rs which is obtained when the outer and inner rings 2, 3 are mounted with no inclination. However, when the rolling bearing is actually mounted, as shown in FIG. 5(b), there can be generated an inclination a between the outer and inner rings 2, 3 due to the mounting error of the rolling bearing.

In this case, the diameter $D_2$ of the raceway surface 2a of the outer ring 2, the outside diameter $d_4$ of the rolling element 4, and the diameter $D_3$ of the raceway surface 3a of the inner ring 3 shown in FIG. 5(a) are respectively changed into $D_{2\alpha}$, $d_{4\alpha}$, and $D_{3\alpha}$, so that the bearing effective clearance is narrowed down to $\Delta R_s$.

Therefore, in case where the initially set radial clearance is excessively small, actually, the radial clearance becomes too small and thus there is a possibility that the rotary action of the rolling element 4 through provision of the radial clearance can be reduced by half.

However, as described before, in case where the initial radial clearance is set such that the bearing effective clearance is 0.020 mm or more, there can be secured necessarily and sufficiently the above-mentioned operation effect that, due to the difference between the circumference length of the virtual inscribed circle and the circumference length of the actual raceway surface of the inner ring 3, the contact position between the rolling element 4 and the race way surface of the inner ring 3 is gradually shifted.

In this case, in case where the radii of curvature of the raceway surface 3a of the inner ring 3 and the raceway surface 2a of the outer ring 2 are set in the range of 50.5-56% of the diameter of the rolling element 4, preferably, in the range of 51-54%, the above-mentioned contact position can be shifted more smoothly.

Also, in the above structure, preferably, the respective groove depths of the raceway surface 3a of the inner ring 3 and the raceway surface 2a of the outer ring 2 may be designed such that they are 17% or more of the diameter of the rolling element 4. In the rolling bearing according to the invention, since the bearing effective clearance is defined to be 0.020 mm or more, there is a fear that the play of the rolling bearing can increase to thereby lower the ball run-onto-groove-shoulder. In view of this, by setting the respective groove depths of the raceway surfaces 3a, 2a of the inner and outer rings to be 17% or more of the diameter of the rolling element 4, the lowering of the run-onto-top property can be restricted.

Figure 9:
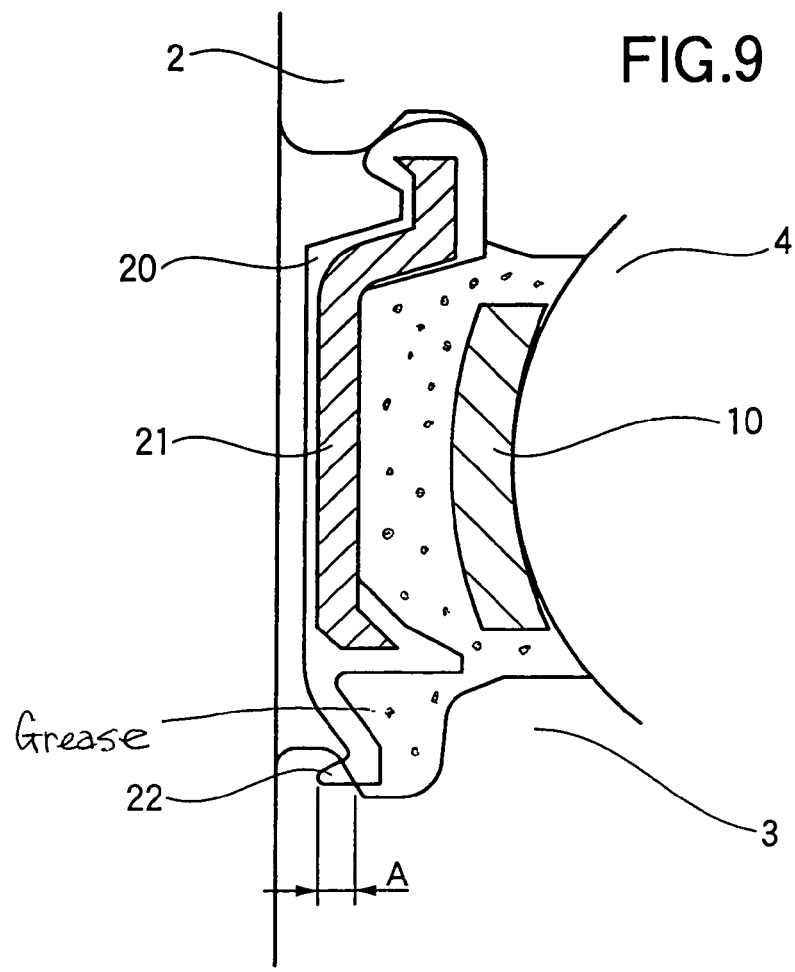
FIG. 9 is a section view to explain the interference of the seal lip.

And, because the bearing effective clearance is defined to be 0.020 mm or more, there also arises a fear that, in case where a contact seal is used, grease can leak. In view of this, while the peripheral portion of a seal 20 is enlargedly shown in FIG. 9, preferably, the interference A of the seal lip 22 of the seal 20 may be set at 60% or more of the axial clearance so as to be able to prevent the leakage of the grease (not shown). By the way, in FIG. 9, reference character 21 designates a base member which is made of metal and forms the seal 20, and 10 stands for a retainer.

In the above-structured rolling bearing 1, the sealed grease is not limited to a special one but, preferably, there may be used base oil having a dynamic viscosity of 80 mm²/s or more at 40° C. The higher the viscosity of base oil is, the higher the strength of an oil film to be formed by the base oil is, which provides an advantage in controlling wear caused by the fretting. To check the fretting resistance according to the difference between the dynamic viscosities of the base oil, the following test was conducted.

Figure 10:
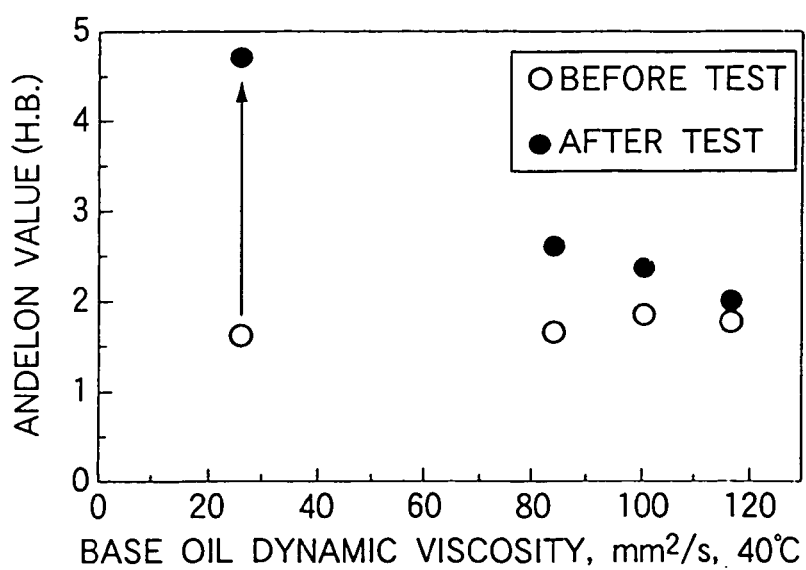
FIG. 10 is a graphical representation of the results obtained when Andelon values of the bearing are measured using several kinds of grease differing in the base oil dynamic viscosity; and, FIG. 11 is a graphical representation of the results obtained when the ball run-onto-groove-shoulder interference rates are measured while varying the depths of the grooves.

That is, as shown in Table 1, lithium soap was compounded in the same quantity into four kinds of synthetic oil (poly-α-olefin oil) differing in the dynamic viscosity at 40° C. to thereby prepare four kinds of grease; these four kinds of grease were respectively loaded into test bearings (type number: 6202, effective clearance: 0 mm (the clearance is eliminated by an axial load)) so that the grease occupies 35 volume percent of the bearing space; and, the grease was sealed in by seals. And, vibration tests were conducted on the respective test bearings in their stationary states and the Andelon values of the test bearings before and after the tests were measured. This Andelon value measurement means that the larger the Andelon values are, the more often strange sounds due to the fretting wear occur. The test results are shown in FIG. 10. As can be seen from FIG. 10, in case where there is used base oil having a dynamic viscosity at 40° C. of 80 mm$^2$/s, an increase in the andelon value is small. That is, it has been found that use of such base oil is effective in restricting the fretting wear.

TABLE 1

| | Grease composition | | | |
|---|---|---|---|---|
| | Grease A | Grease B | Grease C | Grease D |
| Thickening agent | (Li) | (Li) | (Li) | (Li) |
| Base oil | Synthetic oil | Synthetic oil | Synthetic oil | Synthetic oil |
| Dynamic Viscosity of Base oil | 26 | 84 | 101 | 117 |
| Worked penetration | 250 | 248 | 281 | 270 | unit: mm$^2$/s, 40° C.

Also, the ball run-onto-groove-shoulder property was evaluated. That is, there were prepared test bearings each having an inside diameter φ50 mm, an outside diameter φ72 mm, a width 12 mm, an effective clearance 0.006 mm, and respectively having different groove depths, grease prepared by compounding lithium soap into poly-α-olefin oil was loaded into the test bearings in such a manner that the grease occupies 35 volume percentage of the bearing space, and the grease was sealed in by seals. And, the test bearings were rotated under the axial load of 4900N and were checked for the presence or absence of the ball run-onto-groove-shoulder property. The results of this check are shown in FIG. 11 in such a manner that a case, where the end of the contact ellipse runs onto the shoulder of the groove, is expressed as [+] and a case, where the end of the contact ellipse does not run onto the groove shoulder, is expressed as [−].

Figure 11:
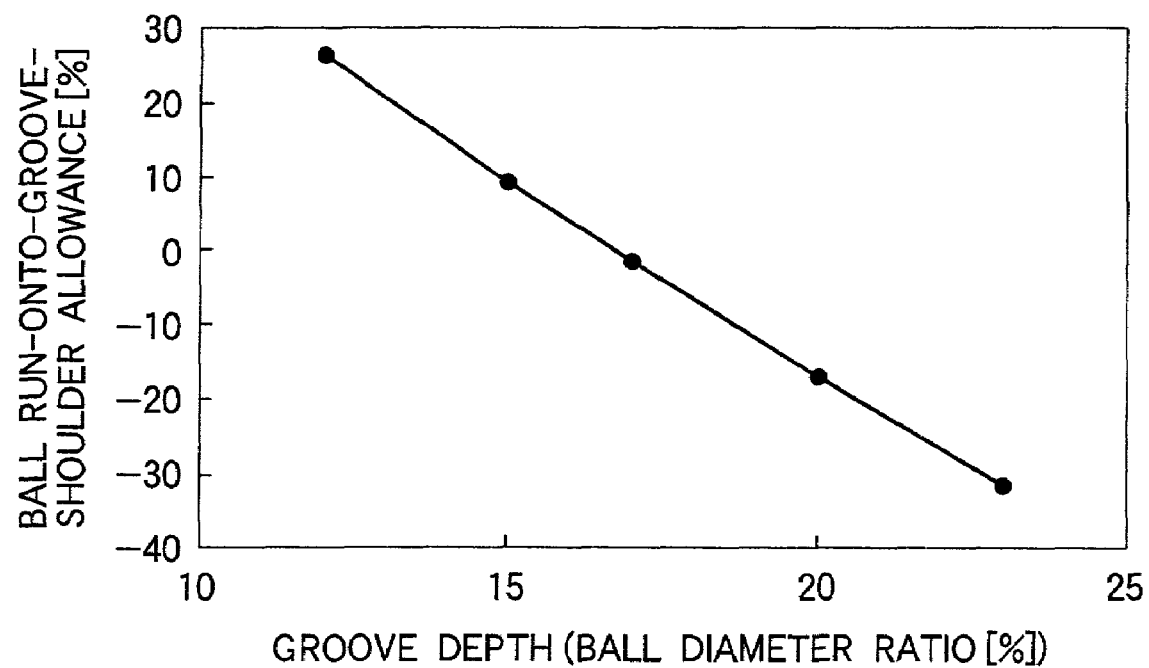

As shown in FIG. 11, in case where the groove depth (ball diameter ratio) is in the range of 17% or more, the ball run-onto-groove-shoulder allowance shows [−].

By the way, the above embodiment is an embodiment of a rolling bearing for use in, for example, a supercharger, in which, when an electromagnetic clutch is on, the rotary body 6 is rotated through the belt and the rotation of the rotary body 6 is transmitted to the shaft 8; and, when the electromagnetic clutch is off, the rotary body 6 is rotated through the belt but the shaft 8 remains stationary. However, the rolling bearing may also be used in another embodiment, that is, the input and output sides of the rotation force may be reversed.

That is, the invention may also apply to a structure such as a rolling bearing for use in a crankshaft, in which, when an electromagnetic clutch is on, the shaft 8 serves as a drive side and the rotary body 6 rotates with the relative rotation zero; and, when the electromagnetic clutch is off, the rotary body 6 rotates through the belt, whereas the shaft 8 remains stationary.

According to the rolling bearing of the invention, in a rolling bearing which, with the relative rotation between inner and outer rings zero, can be used on receiving a rotation load, there is eliminated a fear of incurring the complication of the process for manufacturing the component parts of the rolling bearing, the fretting can be prevented inexpensively and positively, generation of strange sounds and reduction in the life of the rolling bearing due to local wear caused by the fretting can be prevented, and reduction in the life of the grease caused by worn powder due to the local wear can be prevented.

Also, the above effects can be obtained similarly not only in a combined ball bearing but also in a double row ball bearing and a single row ball bearing.

What is claimed is:

1. A rolling bearing apparatus comprising:
a roller bearing including
a plurality of rolling elements held between an inner ring and an outer ring by a retainer, and
grease sealed in said rolling bearing by a seal;
a rotary body provided with said outer ring; and
a shaft provided with said inner ring,
wherein said rolling bearing apparatus is configured such that said rotary body and said shaft are connected together by a clutch mechanism,
when said rotary body and said shaft are connected, said rolling bearing can be used on receiving a rotation load, while the relative rotation between said inner and outer rings is zero,
wherein an initial radial clearance between said inner and outer rings is set such that a bearing effective clearance when said rolling bearing is incorporated between said rotary body and said shaft can provide a positive value; and
wherein the positive value of the radial clearance is set such that the contact position of the rolling element with respect to the raceway surface of the inner ring is gradually shifted when the relative rotation between inner and outer rings is zero.

2. A rolling bearing as set forth in claim 1, wherein said bearing effective clearance is set at 0.020 mm or more.

3. A rolling bearing as set forth in claim 1, wherein the depths of grooves formed in said inner and outer rings are respectively 17% or more of the diameter of one of said rolling elements.

4. A rolling bearing as set forth in claim 2, wherein the depths of grooves formed in said inner and outer rings are respectively 17% or more of the diameter of one of said rolling elements.

5. A rolling bearing as set forth in claim 1, wherein an interference of a seal lip of said seal is 60% or more of an axial clearance.

6. A rolling bearing as set forth in claim 2, wherein an interference of a seal lip of said seal is 60% or more of an axial clearance.

7. A rolling bearing as set forth in claim 3, wherein an interference of a seal lip of said seal is 60% or more of an axial clearance.

8. A rolling bearing as set forth in claim 4, wherein an interference of a seal lip of said seal is 60% or more of an axial clearance.

9. A rolling bearing as set forth in claim 1, wherein the dynamic viscosity at 40° C. of a base oil of said grease is 80 mm$^2$/s or more.

10. A rolling bearing as set forth in claim 2, wherein the dynamic viscosity at 40° C. of a base oil of said grease is 80 mm$^2$/s or more.

11. A rolling bearing as set forth in claim 3, wherein the dynamic viscosity at 40° C. of a base oil of said grease is 80 mm$^2$/s or more.

12. A rolling bearing as set forth in claim 4, wherein the dynamic viscosity at 40° C. of a base oil of said grease is 80 mm$^2$/s or more.

13. A rolling bearing as set forth in claim 5, wherein the dynamic viscosity at 40° C. of a base oil of said grease is 80 mm²/s or more.

14. A rolling bearing as set forth in claim 6, wherein the dynamic viscosity at 40° C. of a base oil of said grease is 80 mm²/s or more.

15. A rolling bearing as set forth in claim 7, wherein the dynamic viscosity at 40° C. of a base oil of said grease is 80 mm²/s or more.

16. A rolling bearing as set forth in claim 8, wherein the dynamic viscosity at 40° C. of a base oil of said grease is 80 mm²/s or more.

17. A rolling bearing apparatus comprising:
   a roller bearing including a plurality of rolling elements held between an inner ring and an outer ring by a retainer, and
   grease sealed in said rolling bearing by a seal;
   a rotary body provided with said outer ring; and
   a shaft provided with said inner ring,
   wherein said rolling bearing apparatus is configured such that said rotary body and said shaft are connected together by a clutch mechanism,
   when said rotary body and said shaft are connected, said rolling bearing can be used on receiving a rotation load, while the relative rotation between said inner and outer rings is zero,
   wherein an initial radial clearance between said inner and outer rings is set such that a bearing effective clearance when said rolling bearing is incorporated between said rotary body said shaft can provide a positive value; and
   wherein the positive value of the radial clearance is set such that the contact position of the rolling element with respect to the raceway surface of the inner ring is shiftable in a circumferential direction when the relative rotation between inner and outer rings is zero.

* * * * *